United States Patent
Shibayama et al.

Patent Number: 6,163,035
Date of Patent: Dec. 19, 2000

[54] METHOD OF, AND APPARATUS FOR, MEASURING POSITION OF HOLE

[75] Inventors: Takao Shibayama; Yoshinobu Kawasaki, both of Saitama-ken, Japan

[73] Assignee: Honda Giken Kogyo Kabushiki Kaisha, Tokyo, Japan

[21] Appl. No.: 09/110,320

[22] Filed: Jul. 6, 1998

[30] Foreign Application Priority Data

Jul. 7, 1997 [JP] Japan ..................................... 9-181550
Mar. 13, 1998 [JP] Japan ................................. 10-062962

[51] Int. Cl.⁷ .................................................. G01B 11/00
[52] U.S. Cl. ................................ 250/559.33; 250/559.42; 356/375
[58] Field of Search ..................................... 250/234, 235, 250/559.29, 559.3, 559.31, 559.33, 559.38, 559.4, 559.42, 559.06; 356/375, 378

[56] References Cited

U.S. PATENT DOCUMENTS

| | | | |
|---|---|---|---|
| 4,690,563 | 9/1987 | Barton et al. | 356/375 |
| 4,980,570 | 12/1990 | Ysunaga et al. | 250/559.05 |
| 5,430,547 | 7/1995 | Takagi et al. | 356/375 |
| 5,771,309 | 6/1998 | Yamaoka et al. | 382/152 |
| 5,778,548 | 7/1998 | Cerruti | 33/503 |
| 5,866,915 | 2/1999 | Pryor | 250/559.2 |

*Primary Examiner*—John R. Lee
*Attorney, Agent, or Firm*—Armstrong, Westerman, Hattori, McLeland & Naughton

[57] ABSTRACT

On a measuring head which is mounted on a working end of a robot, there are provided an optical distance measuring device and a mirror which refracts an optical axis of the distance measuring device toward the plate surface of a workpiece. The measuring head is moved such that a point of irradiation of a light beam relative to the workpiece moves along a scanning line which is set so as to cross a hole edge point. The position at which the measured distance rapidly changes is set as the position of the hole edge point of a hole which crosses the scanning line. In case holes are respectively formed in a pair of plate portions which lie opposite to each other, the measuring head is provided with a distance measuring device and a mirror in a pair respectively so that the positions of both the holes on both sides can be measured at the same time.

6 Claims, 11 Drawing Sheets

METHOD OF, AND APPARATUS FOR, MEASURING POSITION OF HOLE

BACKGROUND OF THE INVENTION

1. Field of the Invention

The present invention relates to a method of, and an apparatus for, measuring the position of a hole, such as a connecting hole which is formed in a workpiece, such as a sub-frame of a motor vehicle, for the purpose of connecting a suspension element.

2. Description of the Related Art

Conventionally, the measuring of the position of a hole is performed in the following manner. Namely, a measuring head which is provided with two cameras disposed such that the optical axes thereof cross at an angle to each other, as well as a spot light source, is mounted on an operating end of a robot. A spot light is irradiated onto a workpiece in a state in which the measuring head is aligned in a predetermined measuring position which lies opposite to the hole. In this state the workpiece is pictured by the two cameras. The position of the center of the hole on a screen of each of the cameras is obtained by image processing, and the position of the center of the hole in the spatial coordinate system is computed by the principle of triangulation.

In the above-described conventional example, that light/dark border portion on the periphery of the hole which appears as a dark portion on the screen of the camera is defined to be a hole edge portion. The center of the hole is obtained based on the position of this hole edge portion. However, the light/dark border portion is likely to become dim or obscure due to the effect of noises, or the like. As a result, the position of the hole edge portion to be detected deviates to thereby cause a measuring error. Further, at least one of the two cameras is operated to picture the workpiece in a slanted or inclined direction. Therefore, in measuring a deep hole, such as a thread hole, the shape of the image to appear on the screen of the camera is distorted due to the reflected light on an inner surface of the hole. As a result, the position of the center of the detected hole deviates to thereby give rise to an error in measuring the coordinates of the center of the hole in the spatial coordinate system.

Furthermore, because the two cameras must be provided, the measuring head becomes large in size. Therefore, the measuring head cannot enter a complicated or congested place of the workpiece, with the result that the measuring of a hole formed in such a place becomes difficult.

In view of the above-described points, the present invention has an object of enabling to measure the position of a hole at a high accuracy as well as to measure a hole formed in a complicated place of a workpiece.

SUMMARY OF THE INVENTION

In order to attain the above and other objects, according to a first aspect of the present invention, there is provided a method of measuring a position of a hole which is formed in a workpiece, the method comprising: moving a distance measuring device which measures a distance to an object to be measured by irradiating and receiving light to and from the object, the moving being made relative to the workpiece such that a point of irradiation of the light beam onto the workpiece moves along a scanning line which is set so as to cross a hole edge; and obtaining coordinates of a hole edge point based on a change in that distance to the workpiece which is measured by the distance measuring device while moving the measuring device.

According to another aspect of the present invention, there is provided an apparatus for measuring a position of a hole formed in a workpiece, comprising: a distance measuring device which is mounted on a measuring head on a working end of a robot and which measures a distance to an object to be measured by irradiating and receiving light to and from the object of measurement; wherein the distance measuring device is moved such that a point of irradiation of light beam onto the workpiece moves along a scanning line which is set so as to cross an edge of the hole.

If the point of irradiation of the light beam (also simply called the irradiation point) is moved along the scanning line, the distance to be measured by the distance measuring device rapidly increases at a point where the irradiation point has entered the hole and rapidly decreases at the point where it has cleared (or moved out of) the hole. Therefore, that point on the scanning line at which the measuring distance rapidly changes, accurately coincides with the hole edge point of the hole. Here, the coordinates of the point on the scanning line on the planar coordinate system, which crosses at right angles the optical axis of the measuring device, are known. Further, the coordinates in the direction of the optical axis is the distance to be measured by the distance measuring device. Therefore, coordinates of the hole edge point in the spacial coordinate system can be measured at a higher accuracy.

As a method of measuring the coordinates of the center of a hole, the following is considered. Namely, the distance measuring device is moved so that the irradiation point moves along a first scanning line which is set so as to cross the hole. From a position in which the irradiation point enters the hole, resulting in a rapid increase in the measured distance, the coordinates of the first hole edge point which crosses the first scanning line is obtained. From a position in which the irradiation point clears the hole, resulting in a rapid decrease in the measured distance, the coordinates of the second hole edge point which crosses the first scanning line are obtained. Then, the distance measuring device is moved so that the irradiation point moves along that second scanning line passing through the second hole edge point which is inclined relative to the first scanning line. From the position at which the measured distance rapidly decreases by the clearing of the irradiation point from the hole, the coordinates of a third hole edge point which crosses the second scanning line are obtained. An equation of a circle which passes through these three hole edge points is computed to thereby define the coordinates of the center of this circle as the center of the hole.

If the speed of movement of the distance measuring device is increased, the resolution of positional detection of the point at which the measured distance rapidly changes, i.e., the hole edge point, decreases. Then, if the scanning lines are set as explained hereinabove, there is a possibility that the position of the hole edge point which crosses each of the scanning lines largely deviates due to the deviation of the hole position in a direction normal (i.e., at right angles) to the scanning line. Therefore, in order to detect the position of the hole edge point at a high resolution, it becomes necessary to move the distance measuring device over the entire range of each of the scanning lines at a low speed. This results in a longer time for measuring.

In addition, the distance measuring device is arranged to be moved by a composite (or compound) motion of a plurality of axes of a robot. The position of the distance measuring device is recognized by a robot controller which controls the movement of each of the axes of the robot. The actual position of the measuring device sometimes deviates from the position recognized by the robot controller due to the backlash, or the like, of the driving system for each axis. Here, if the scanning line is constant, the mode of composite motion of the plurality of axes of the robot also becomes constant. Since the amount of positional deviation of the distance measuring device due to backlash, or the like, also becomes constant, the position of the actual locus of movement of the measuring device also becomes constant. As a result, when the distance measuring device is moved so that the irradiation point moves along the first scanning line that can be unequivocally determined, those coordinates of the first and second hole edge points which are obtained by the position of the distance measuring device to be recognized by the robot controller have a predetermined relative positional relationship, depending on the deviation of the hole edge point, with those coordinates of the first and second hole edge points which are similarly obtained by moving the measuring device relative to a master workpiece so that the irradiation point moves along the fist scanning line.

On the other hand, the second scanning line deviates parallelly from the second scanning line at the time of measuring the hole edge point of the master workpiece depending on the position of the second hole edge point. The mode of composite motion of a plurality of axes of the robot to move the distance measuring device so that the irradiation point moves along the second scanning line varies with the displacement of the second scanning line. If the mode of the composite motion varies in this manner, the degree of effect of the backlash of the driving system of each of the axes on the position of the measuring device varies. As a result, the amount of positional deviation of the distance measuring device becomes different from that at the time of measuring the master workpiece. Therefore, when the distance measuring device is moved so that the irradiation point moves along the second scanning line, there will no longer be established an accurate correlative relationship depending on the deviation in the hole position between the following two sets of coordinates, i.e., those coordinates of the third hole edge point which are obtained from the position of the measuring device to be recognized by the robot controller and those ordinates of the third hole edge point which are similarly obtained when the distance measuring device is moved relative to the master workpiece so that the irradiation point moves along the second scanning line. The measuring accuracy of the hole edge point thus becomes poor.

In order to solve the above-described disadvantage, preferably the following method may be employed according to the present invention. Namely, the steps are: setting a position of origin in which the point of irradiation coincides with a center of the hole in a normal position, and a plurality of positions of scanning reference points in which the point of irradiation coincides with a plurality of points on a reference circle which is coaxial with the hole in the normal position and whose radius is slightly larger than a value to be obtained by adding to the radius of the hole an estimated maximum deviation of the center of the hole; moving the distance measuring device in sequence to each of the scanning reference points to linearly move the distance measuring device from each of the scanning reference points to the position of origin such that the point of irradiation moves along each of the scanning lines which connects each point on the reference circle to a center of the reference circle; wherein a speed of moving the distance measuring device is kept relatively low until the distance to the workpiece to be measured by the distance measuring device changes at the hole edge point which crosses the scanning line, and thereafter the distance measuring device is moved to the next position of scanning reference point via the position of origin at a relatively high speed.

According to this method, the scanning line is set as a radial line which is directed to the center of the reference circle. Therefore, it is only when the hole position deviates in the direction opposite to the position of the reference circle relative to the normal center of the hole that the distance increases between the point on the reference circle and the hole edge point of a hole which crosses the scanning line. This distance falls within a range below two times the estimated maximum amount of deviation. The distance at which the distance measuring device must be moved at a low speed becomes relatively short. Then, since the distance measuring device is moved at a high speed from the position of detecting the hole edge point to the position of the next scanning reference point, the time required for the movement of the measuring device can be shortened, with the result that the hole edge point can be measured efficiently.

Further, each of the scanning lines is unequivocally set as a radial line which connects each of the points on the reference circle and the center of the reference circle. Therefore, the scanning lines do not displace due to the deviation in the hole position.

The following way may also be considered. Namely, when the hole edge point of a hole has been detected, the distance measuring device is linearly moved from the detected position of detecting the hole edge point to the position of the next scanning reference point. In this case, however, if the position of the hole edge point deviates due to the deviation of the position of the hole, the straight line which connects the position of detecting the hole edge point and the position of the next scanning reference point displaces. Accompanied by this displacement, the mode of composite motion of the plurality of axes of the robot to move the distance measuring device to the position of the next scanning reference point varies from workpiece to workpiece. As a result, the amount of positional deviation of the distance measuring device at the position of the next scanning reference point deviates from workpiece to workpiece. The position of the actual locus of movement of the distance measuring device from this position of the scanning reference point also deviates from workpiece to workpiece.

In the above-described method of the present invention, on the other hand, the distance measuring device is moved from the position of detecting the hole edge point to the next position of the scanning reference point via the position of origin. Therefore, the path of movement of the distance measuring device from the position of detecting the hole edge point to the position of the next scanning reference point becomes constant. Therefore, even if the actual position of the distance measuring device deviates from the position recognized by the robot controller due to backlash, or the like, of the driving system of each of the axes of the robot, the amount of positional deviation of the distance measuring device in the next point of the scanning reference point does not vary from workpiece to workpiece, but becomes constant. The position of the actual locus of movement of the distance measuring device from this position of the scanning reference point also becomes constant. As a result, when the distance measuring device is moved so that the irradiation point moves along each of the scanning lines, there will be established an accurate co-relationship, depending on the deviation of the hole edge point, between those coordinates of each of the hole edge points which are obtained by the position of the distance measuring device recognized by the robot controller and those coordinates of each of the hole edge points which are similarly obtained by moving the distance measuring device relative to the master workpiece so that the irradiation point moves along each of the scanning lines. By comparing those coordinates of the center of the hole in the workpiece which are computed from the coordinates of these hole edge points and those coordinates of the center of the hole in the master workpiece, the position of the hole can be accurately measured.

The following may also be considered. Namely, the scanning reference position and the scanning line are respectively set as three in number. Depending on the distances to the workpiece measured at the three positions of the scanning reference points, equations to represent the surface of forming the hole of the workpiece are obtained. Based on the coordinates of the three hole edge points which cross the three hole edge points, an equation of that circle on the surface of forming the hole which passes through the three scanning lines is obtained. Then, the coordinates of the center of this circle are defined as the coordinates of the center of the hole. However, it takes time to detect the three hole edge points. Here, since the diameter of the hole is known, preferably the following steps are taken according to the present invention. Namely, the steps are: setting a first scanning reference point at which the point of irradiation coincides with a first point on the reference circle, a second scanning reference point at which the point of irradiation coincides with a second point on the reference circle, and a measuring terminal point at which the point of irradiation coincides with a third point on the reference circle; after measuring the distance to the workpiece at the first scanning reference point, linearly moving the distance measuring device from the first scanning reference point toward the position of origin to obtain coordinates of the first hole edge point which crosses the first scanning line connecting the first point and the center of the reference circle; after measuring the distance to the workpiece at the second scanning reference point, linearly moving the distance measuring device from the second scanning reference point toward the position of origin to obtain coordinates of the second hole edge point which crosses the second scanning line connecting the second point and the center of the reference circle; thereafter moving the distance measuring device to the position of the measuring terminal point via the position of origin to measure the distance to the workpiece; obtaining an equation which represents a plane of forming the hole of the workpiece based on the distance to the workpiece at the positions of the first and second scanning reference points and the position of the measuring terminal point; obtaining equations of two circles on the plane of forming the hole, the two circles being equal in diameter to the hole and passing through both the hole edge points, the equations being obtained based on the coordinates of the first and second hole edge points; and determining the coordinates of the center of the circle whose center is closer to the center of the reference circle as the coordinates of the center of the hole.

According to these steps, the scanning to detect the third hole edge point becomes needless, and therefore the time for measuring can be shortened. Further, by moving the measuring device from the position of detecting the first hole edge point to the position of the second scanning reference point via the position of origin as explained hereinabove, and by moving the distance measuring device from the position of detecting the second hole edge point to the terminal measuring position via the position of origin, the amount of deviation of the measuring device at the terminal measuring position becomes constant without deviation from workpiece to workpiece. The equation of the surface of forming the hole can be accurately computed.

If the measuring head is provided, at a front end of the distance measuring device, with a mirror which deflects an optical axis of the distance measuring device, the distance can be measured by irradiating a light beam from the measuring device to the workpiece without disposing the measuring device opposite to the workpiece. According to this arrangement, it is sufficient to lay, opposite to the workpiece, only the front end portion of the measuring head on which the mirror is mounted. The measuring of a hole formed in a complicated place of the workpiece can also be made.

Further, in case measuring is made of the position of a hole, which is formed in each of a pair of oppositely disposed plate portions of the workpiece, preferably the measuring head is provided with the distance measuring device and the mirror in a pair, respectively, such that the direction of deflection, by one of the mirrors, of an optical axis of one of the measuring devices and the direction of deflection, by the other of the mirrors, of an optical axis of the other of the distance measuring devices are opposite to each other. Thus, it advantageously becomes possible to measure the positions of both the holes by inserting the front end portion of the measuring device into the space between both the plate portions, irradiating the light beam from one of the measuring devices to one of the plate portions and irradiating the light beam from the other of the measuring devices to the other of the plate portions.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 11:
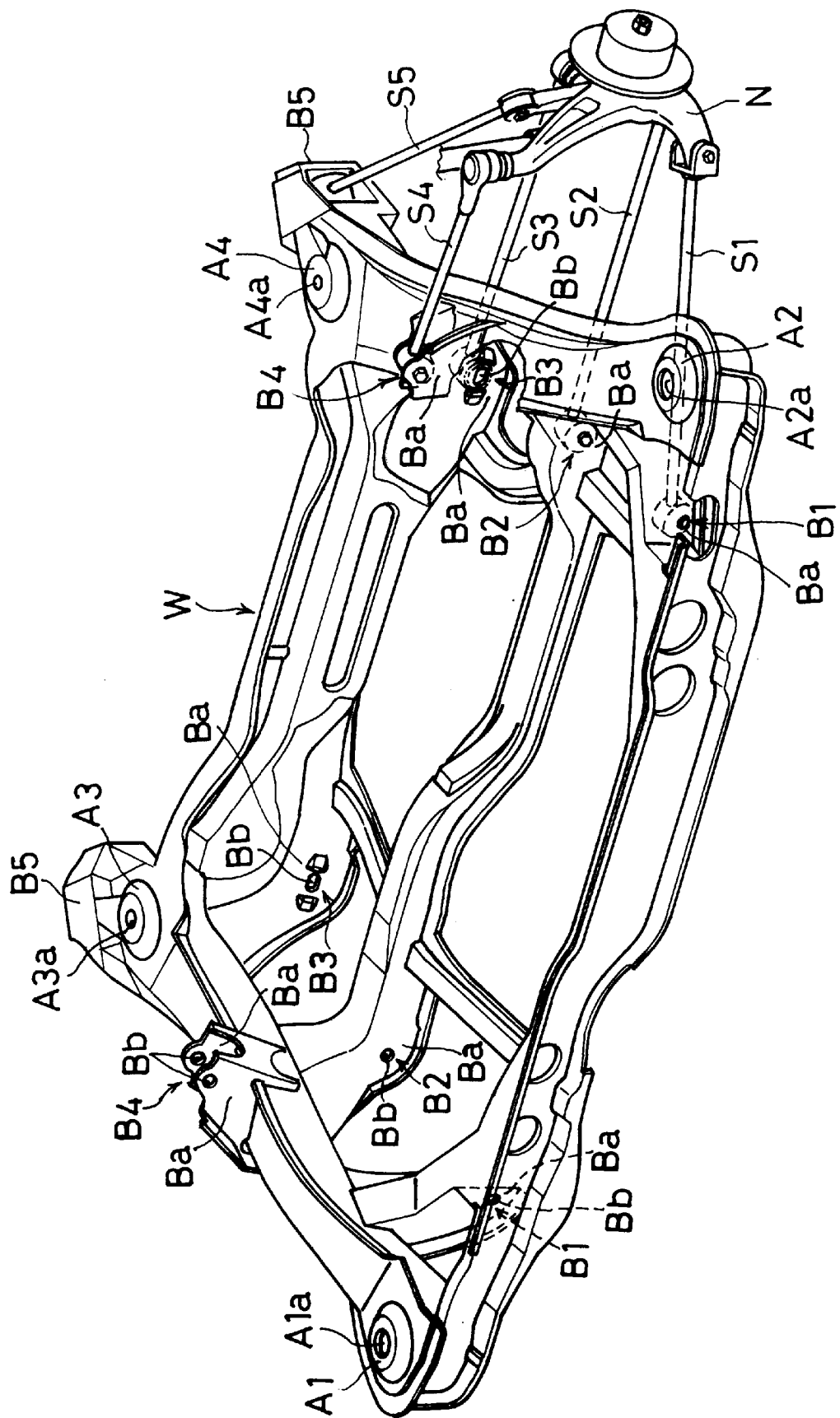
FIG. 11 is a perspective view of a sub-frame which serves as a workpiece.

An explanation will now be made about the present invention with reference to an embodiment in which the present invention is applied to the measuring of that hole for connecting a suspension element which is formed in a sub-frame W which serves as a workpiece, as shown in FIG. 11.

The sub-frame W is provided with a total of four mounting portions A1, A2, A3, A4, in the front and rear ends on right and left sides, for mounting the sub-frame on a vehicle body. Each of the mounting portions A1 through A4 is fastened to the vehicle body by inserting a bolt (not illustrated) which is smaller than the hole diameter into each of mounting holes A1a through A4a.

Figure 9A:
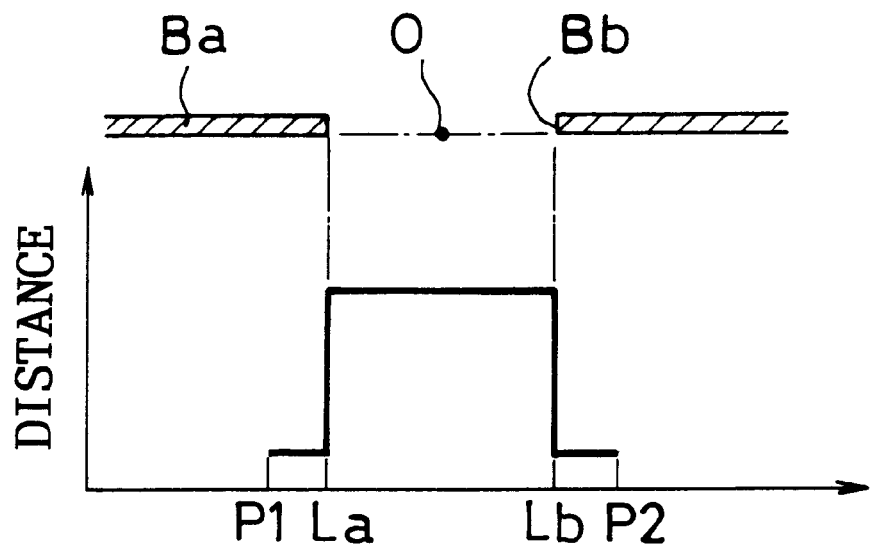
FIG. 9A is a schematic diagram showing the relationship between the hole and the measured distance and FIG. 9B is a schematic diagram showing the relationship between the hole with a nut and the measured distance.
Figure 9B:
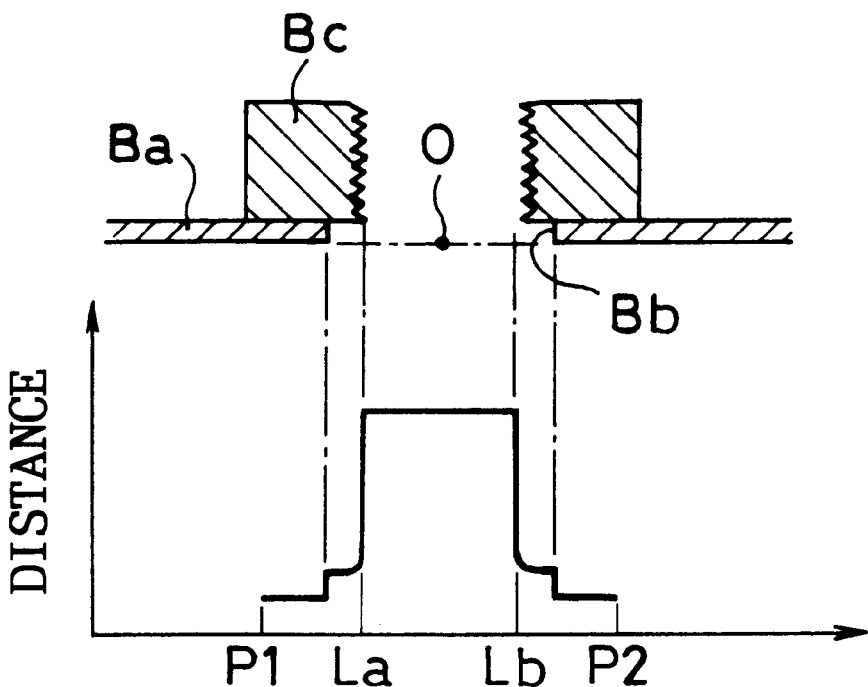

On each of the right and left sides of the sub-frame W, there is assembled a multi-link type of suspension. The multi-link type of suspension is a suspension in which a lower arm to be connected to a lower portion of a knuckle N and an upper arm to be connected to an upper portion thereof are respectively constituted by a plurality of links. In the illustrated example, the lower arm is constituted by a trailing link S1 which is connected to a lower front end of the knuckle N and extends obliquely forward, a lower link S2 which is connected to a lower intermediate portion of the knuckle N and extends laterally, and a control link S3 which is connected to a lower rear end of the knuckle N and extends laterally. The upper arm is constituted by an upper link S4 which is connected to an upper end of the knuckle N and extends laterally, and a leading link S5 which is connected to an upper portion of the knuckle N and extends obliquely rearward. Each of these links is connected to each of connecting portions B1 through B5 which are provided on a side portion of the sub-frame W. Each of these connecting portions B1 through B5 has a pair of oppositely disposed plate portions Ba, Ba. The end portion of each of the links is inserted into the space between both the plate portions Ba, Ba. The end portion of each of the links is swingably mounted on each of the connecting portions by means of a bolt which is inserted through a hole Bb, Bb formed in each of the plate portions Ba, Ba. On an outer surface of one of the plate portions Ba in the connecting portions B1, B2, B4, B5 for the trailing link S1, lower link S2, upper link S4, and leading link S5, there is respectively welded a nut Bc, as shown in FIG. 9B, for coupling the bolt in a threaded manner. The hole Bb which is formed in each of the plate portions Ba in the connecting portion B3 for the control link S3 is formed, as shown in FIG. 10B, into an oblong shape. It is thus so arranged that the alignment can be adjusted by displacing the bolt in the longitudinal direction of the hole Bb by an eccentric cam (not illustrated).

When a deviation occurs in the relative positional accuracy of the connecting portions B1–B5 on each of the right and left sides, it becomes impossible to accurately adjust the alignment only by the adjustment of the control link S3 by means of the eccentric cam. Therefore, after having assembled the sub-frame W, the positions of the connecting portions B1–B5 on each of the right and left sides are measured at a measuring station. A discrimination is then made whether the relative positional accuracy falls within a tolerance or not. Then, only the sub-frame W whose relative positional accuracy falls within the tolerance is transported to the next step as an acceptable workpiece.

Figure 1:
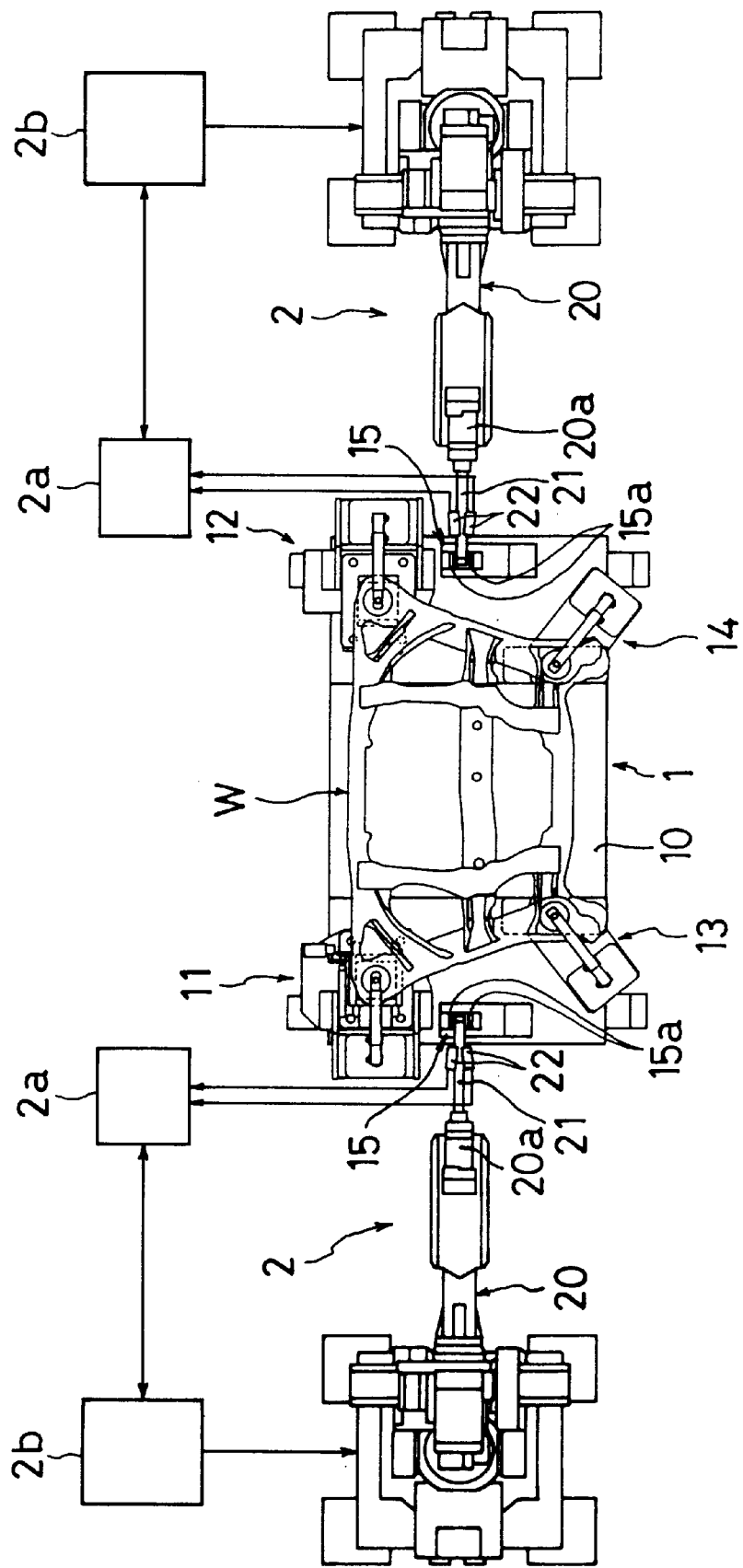
FIG. 1 is a plan view of a measuring station in which a distance measuring device according to the present invention is disposed.
Figure 2:
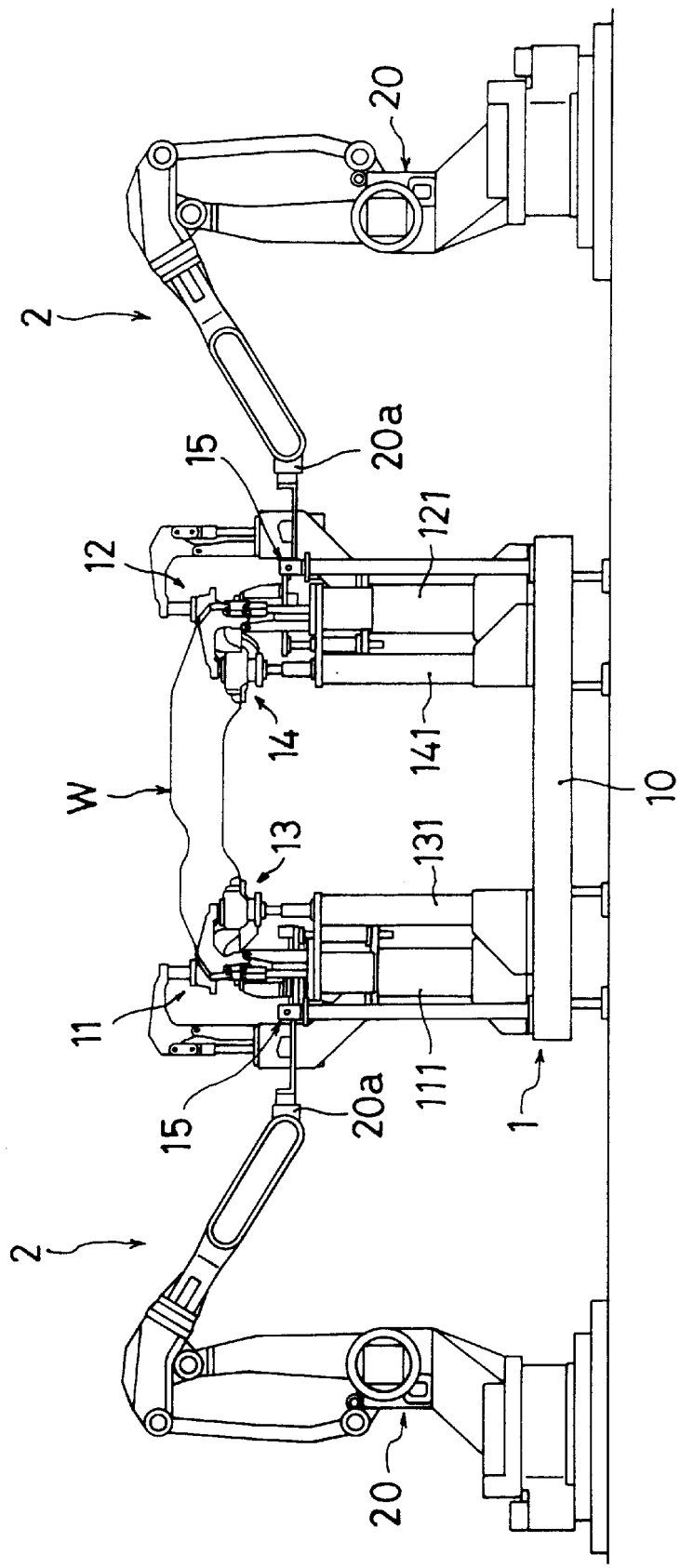
FIG. 2 is a front view of the measuring station.

In the measuring station, as shown in FIGS. 1 and 2, there are disposed a jig 1 which supports the sub-frame W in a fixed or predetermined position, and a total of two right and left measuring devices 2, 2 which measure the positions of the connecting portions B1–B5 on each of the right and left sides of the sub-frame W.

Figure 3:
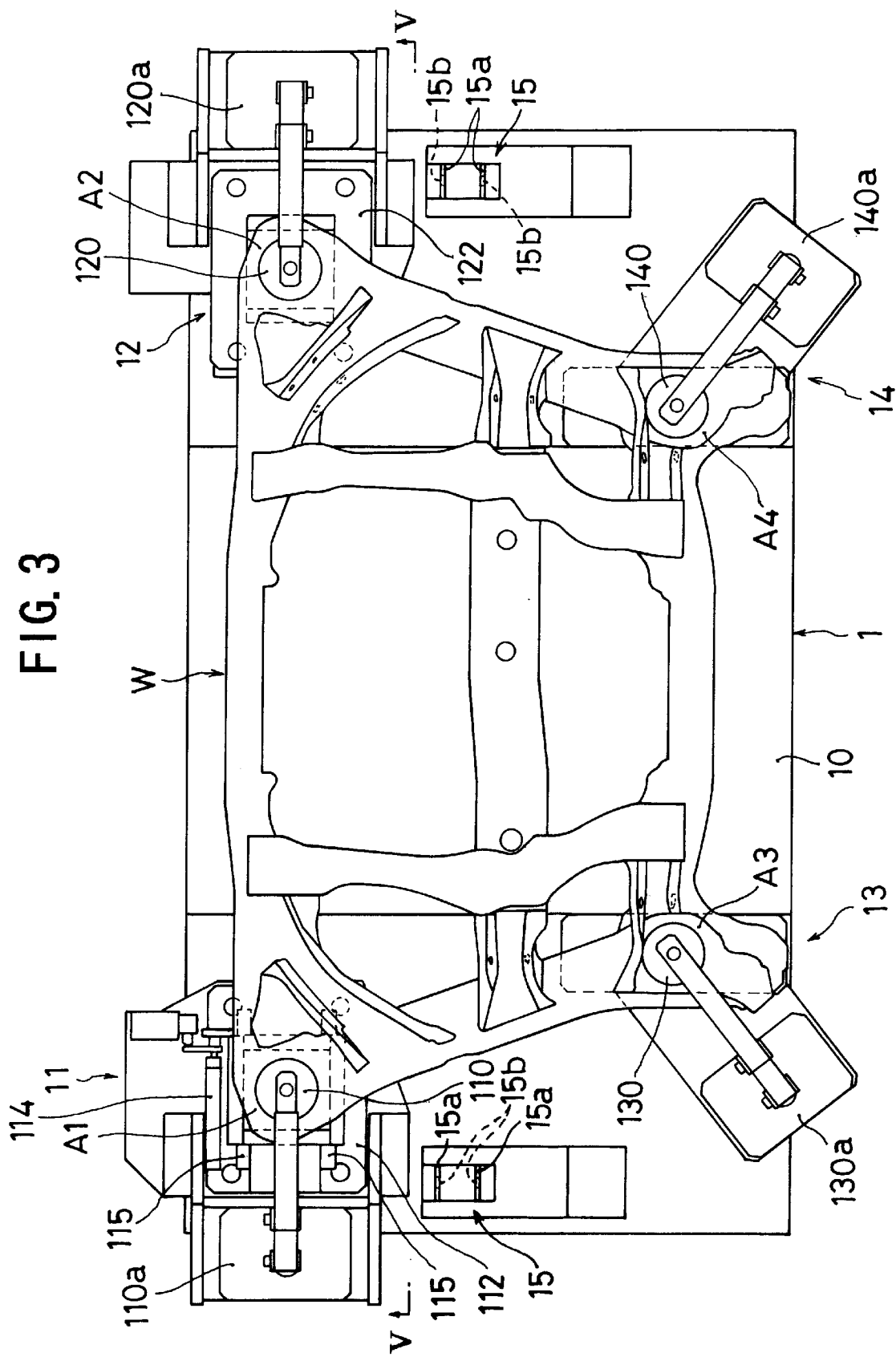
FIG. 3 is a plan view of a jig.
Figure 4:
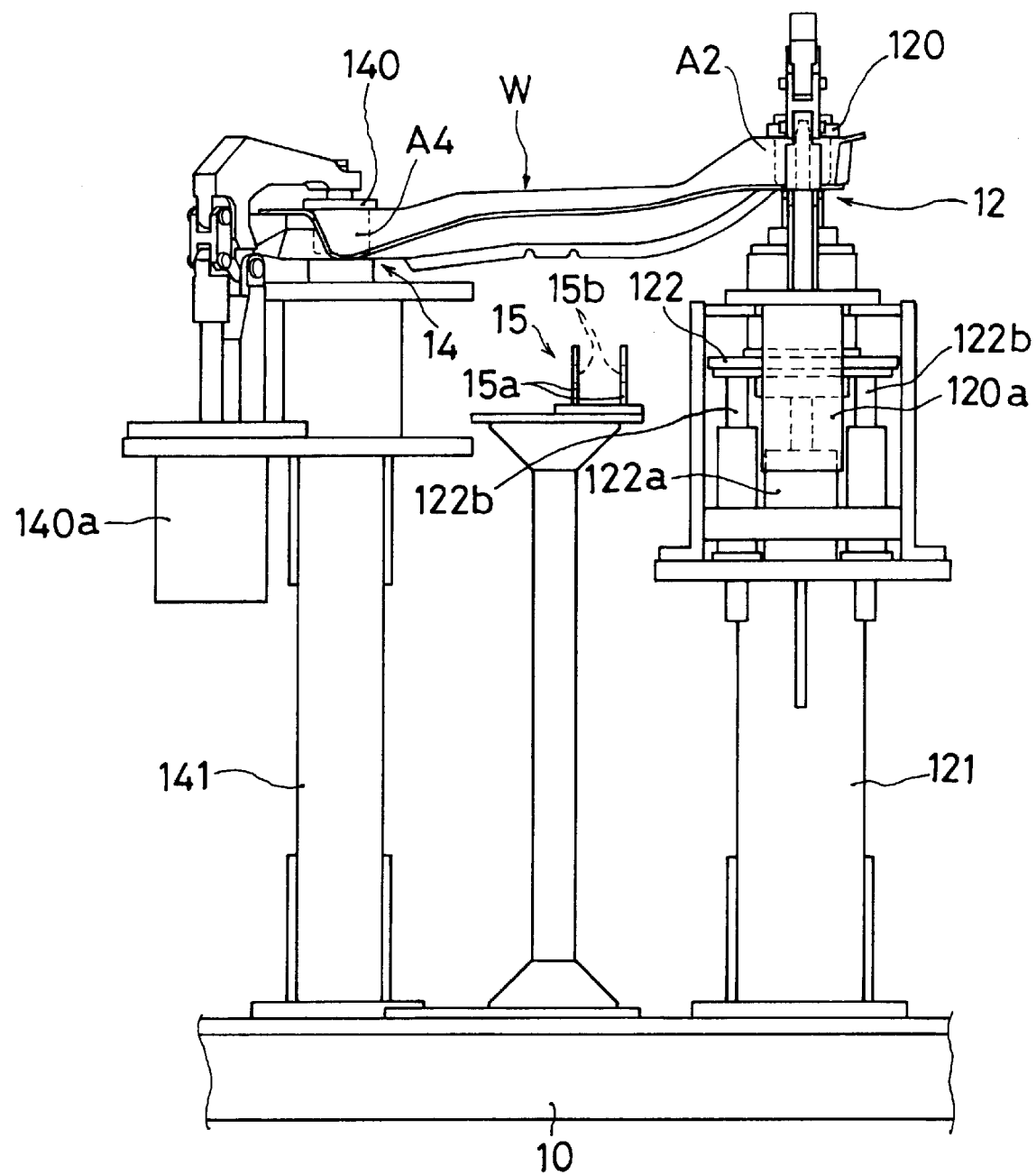
FIG. 4 is a side view of the jig.
Figure 5:
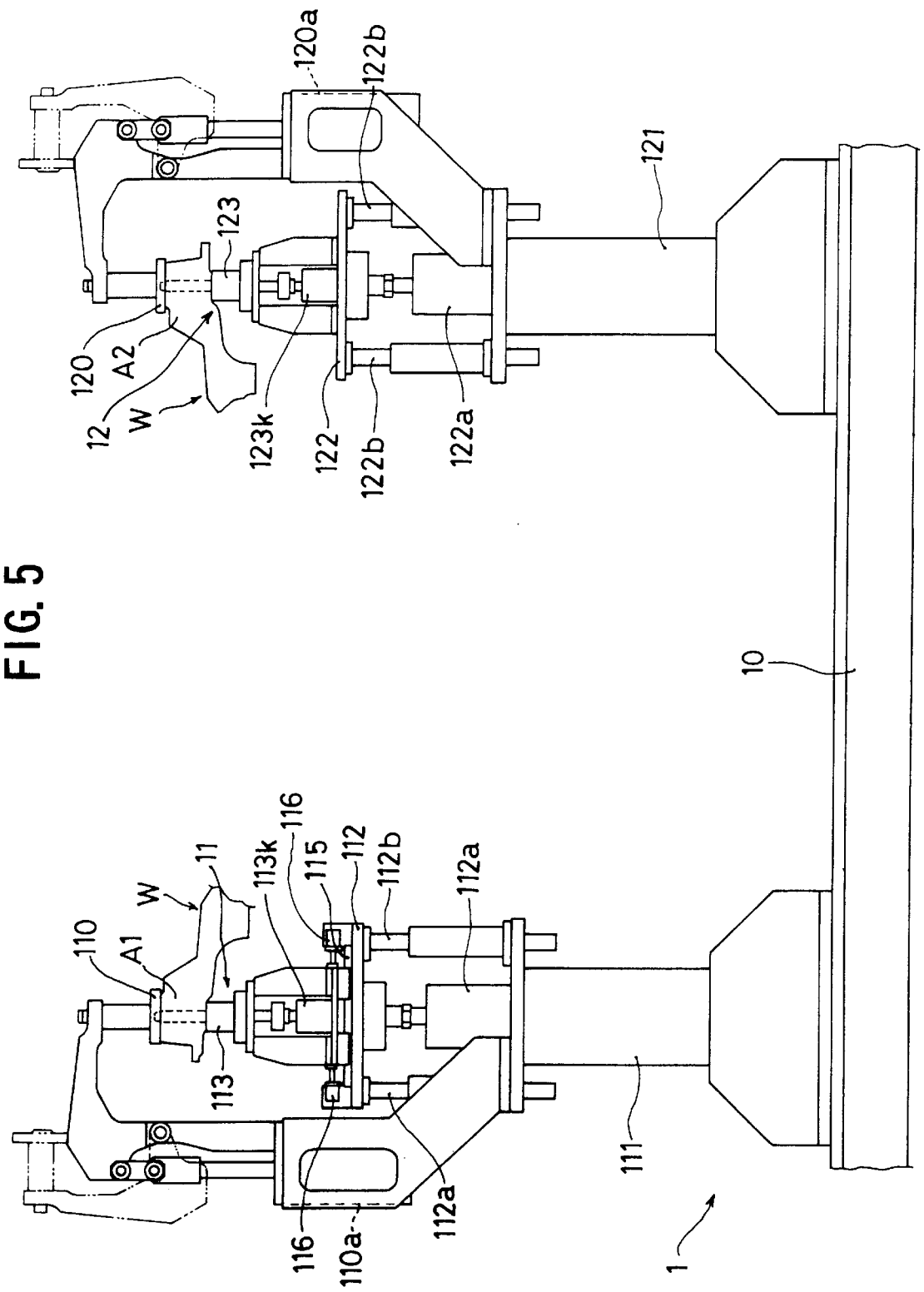
FIG. 5 is a front view taken along the line V—V in FIG. 3.

As shown in FIGS. 3 through 5, the jig 1 is provided with four workpiece receiving members 11, 12, 13, 14 which support the sub-frame W at each of the mounting portions A1–A4. In each of the workpiece receiving members 11–14, there is provided a clamping member 110, 120, 130, 140 which is opened and closed by a cylinder 110a, 120a, 130a, 140a and which pressingly or urgingly fix each of the mounting portions A1–A4 from an upper side. The sub-frame W is transported into the measuring station by a transfer device (not illustrated) in an up-side-down state in which the seating surface of each of the mounting portions A1–A4 relative to the vehicle body faces downward. Then, by the vertical movement of the transfer device, each of the mounting portions A1–A4 is placed on each of the workpiece receiving members 11–14.

The relative positional accuracy of the connecting portions B1–B5 may be sufficient if it falls within a tolerance when the sub-frame W is actually placed in position onto the vehicle body. Even if the sub-frame has some distortion, when each of the mounting portions A1–A4 is tied to the vehicle body, the distortion will be corrected and the relative positional accuracy of the connecting portions B1–B5 may sometimes fall within the tolerance. On the other hand, even if the relative positional accuracy of the connecting portions B1–B5 may have fallen within the tolerance when left alone as the sub-frame itself, the sub-frame W may distort at the time of mounting on the vehicle body due to the positional deviation of the mounting portions A1–A4 in the vertical direction. As a result, the relative positional accuracy of the connecting portions B1–B5 sometimes does not fall within the tolerance. In the present embodiment, by pressingly fix each of the mounting portions A1–A4 by each of the clamping members 110–140, the sub-frame W can be maintained in a state as if each of the mounting portions A1–A4 were tightened to the vehicle body, i.e., in the same state as that in which the sub-frame W is actually mounted in position onto the vehicle body. Therefore, it is possible to accurately discriminate whether the relative positional accuracy of the connecting portions B1–B5 at the time in which the sub-frame W is actually mounted onto the vehicle body falls within the tolerance.

The workpiece receiving members 13, 14 which receive the mounting portions A3, A4 on the rear end of both the right and left sides of the sub-frame W are fixed to columns 131, 141 which are vertically provided on the jig base 10. The workpiece receiving members 11, 12 which receive the mounting portions A1, A2 on the front end of both the right and left sides of the sub-frame W are provided on elevating bases 112, 122. These elevating bases 112, 122, which are provided on supporting columns 111, 121 vertically provided on the jig base 10, are arranged to be moved up and down by cylinders 112a, 122a guided by guide bars 112b, 122b. The height of the workpiece receiving members 11, 12 can be switched depending on the kind of the sub-frame W. The difference in height between the workpiece receiving members 13, 14 on the rear end and the workpiece receiving members 11, 12 on the front end can thus be made to coincide with the difference in height between those rear end and the front end of the vehicle body which receive the sub-frame W.

Figure 6:
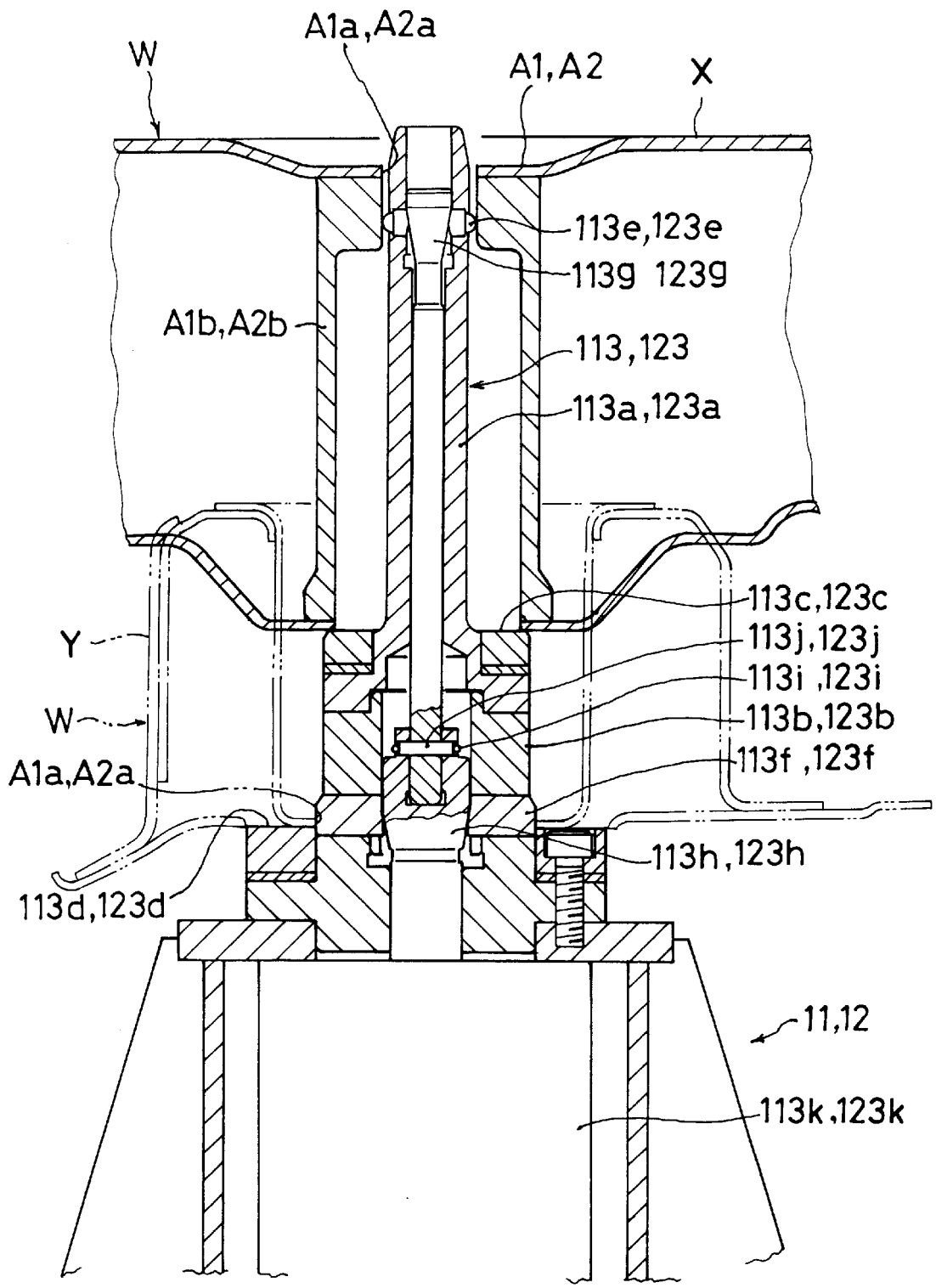
FIG. 6 is a vertical sectional view of a locating pin.

The workpiece receiving members 13, 14 on the rear end are formed flat so that the mounting portions A3, A4 can be moved relative to each other. In the workpiece receiving members 11, 12 on the front end, on the other hand, there are vertically provided locating pins 113, 123 which are fitted into mounting holes A1a, A2a formed in the mounting portions A1, A2. Each of the locating pins 113, 123 is formed, as shown in FIG. 6, into a stepped shape having an upper small-diameter pin portion 113a, 123a and a lower large-diameter pin portion 113b, 123b. In that kind of workpiece as marked X in the figure which has attached thereto a collar A1b, A2b in the mounting hole A1a, A2a, the workpiece receiving member 11, 12 is lowered in height. The small-diameter pin portion 113a, 123a is fitted into the collar A1b, A2b so that the mounting portion A1, A2 is seated onto workpiece receiving surface 113c, 123c on the lower end of the small-diameter pin portion 113a, 123a. On the other hand, in that kind of workpiece as marked Y in the figure which has not attached thereto the collar A1b, A2b in the mounting hole A1a, A2a, the workpiece receiving member 11, 12 is raised in height (though the raised workpiece receiving member 11, 12 is not illustrated). The large-diameter pin portion 113b, 123b is fitted into the collar A1a, A2a so that the mounting portion A1, A2 is seated onto workpiece receiving surface 113d, 123d on the lower end of the large-diameter pin portion 113b, 123b. The mounting hole A1a, A2a of that kind of workpiece as marked Y is thereafter fitted with a collar having a rubber bush.

The small-diameter pin portion 113a, 123a is formed smaller than the inner diameter of the collar A1b, A2b of that kind of workpiece as marked X. The large-diameter pin portion 113b, 123b is formed smaller than the inner diameter of the mounting hole A1a, A2a of that kind of workpiece as marked Y. A plurality of collets 113e, 123e, 113f, 123f which can be respectively moved radially inward and outward are provided respectively in the small-diameter pin portion 113a, 123a and the large-diameter pin portion 113b, 123b. Inside the small-diameter pin portion 113a, 123a there is inserted a rod 113g, 123g having a tapered portion which abuts with an inner end surface of the collet 113e, 123e. Inside the large-diameter pin portion 113b, 123b there is inserted a rod 113h, 123h having a tapered portion which abuts with an inner end surface of the collet 113f, 123f. Both the rods 113g, 113h, 123g, 123h are connected by means of a pin 113j, 123j which is prevented by a ring 113i, 123i from being pulled out of position. When both the rods are moved downward by lower cylinders 113k, 123k, the collet 113e, 123e, 113f, 123f projects diametrically out of the pin portion 113a, 123a, 113b, 123b. The mounting portion A1, A2 is thus aligned relative to the locating pin 113, 123.

The workpiece receiving member 11 is arranged to be movable, relative to the workpiece receiving member 12, in the widthwise direction, i.e., the right and left direction, of the sub-frame W. The amount of displacement of the workpiece receiving member 11 off (or out of) the reference position can be detected by a detecting means 114. In more detail, the workpiece receiving member 11 is slidably supported on a rail 115 which extends in the right and left direction on the elevating base 112. The elevating base 112 is provided with the detecting means 114 which is made up of a potentiometer connected to the workpiece receiving member 11. The displacement of the workpiece receiving member 11 in the right and left direction can thus be detected. The workpiece receiving member 11 is normally held in the reference position by means of a pair of right and left urging cylinders 116, 116.

In order to set the sub-frame W on the jig 1, the workpiece receiving member 11 is held in the reference position. After setting the sub-frame W in position, the restriction of the workpiece receiving member 11 by the urging cylinders 116, 116 is released. In this state, the collets 113e, 123e, 113f, 123f are projected to thereby align the mounting portions A1, A2 relative to the locating pins 113, 123. At this time, if the widthwise dimension in the right and left direction of the sub-frame W deviates from the reference dimension, the sub-frame W receives a horizontal alignment reaction force, whereby the workpiece receiving member 11 displaces in the right and left direction off the reference position. The amount of this displacement is detected by the detecting means 114. Thereafter, each of the clamping members 110–140 is closed to restrict each of the mounting portions A1–A4.

Figure 7A:
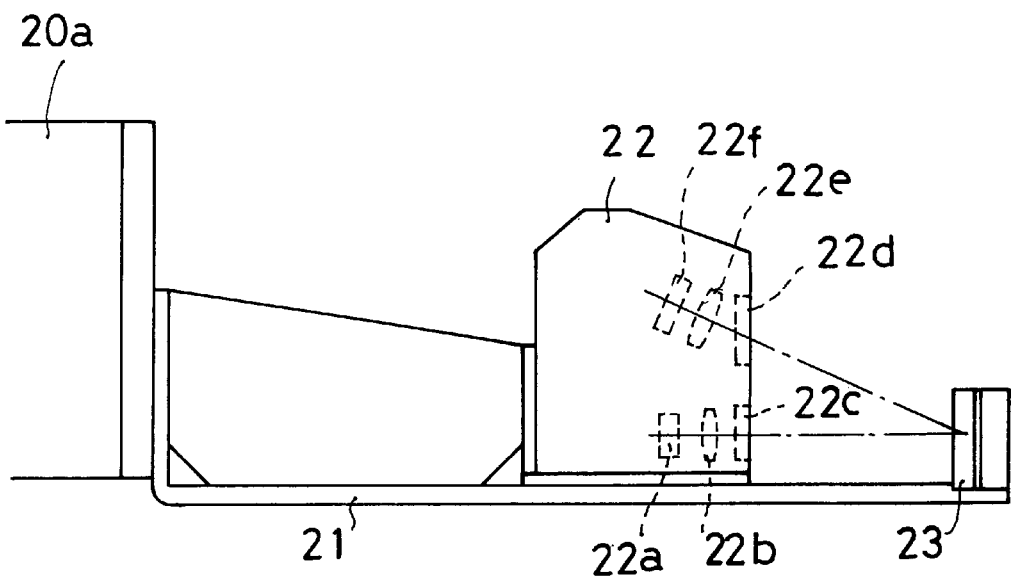
FIG. 7A is a front view of a measuring head.
Figure 7B:
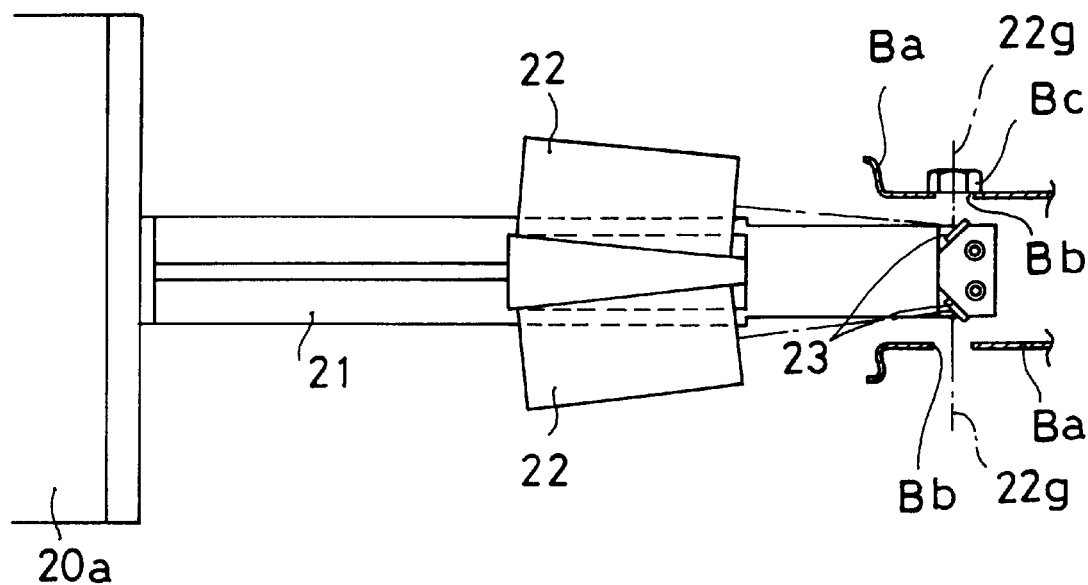
FIG. 7B is a plan view thereof.

The measuring device 2 is made up of a robot 20 and a measuring head 21 which is mounted on a wrist 20a, which serves as the operating end, of the robot 20. As shown in FIGS. 7A and 7B, the measuring head 21 is provided with a distance measuring device 22. As the distance measuring device 22, a distance measuring device (laser range finder) type LK-2000, for example, manufactured by a Japanese company called Keyense can be used. This distance measuring device 22 irradiates a laser beam (wavelength 670 nm) from a laser diode 22a towards an object to be measured through a light transmitting lens 22b and a bandpath filter 22c. The light reflected from the object to be measured is received by a light receiving element 22f which is made up of a CCD (charge-coupled device) element through a bandpath filter 22d and a light receiving lens 22e. The distance to the object to be measured is thus obtained. This distance measuring device has a standard measuring distance of 30 mm and can measure the distance with a resolution of 1 $\mu$m in a measuring range of ±5 mm. The measured data by the distance measuring device 22 are transmitted to a computer 2a.

In the present embodiment, a pair of distance measuring devices 22, 22 are mounted on the measuring head 21 and also a pair of mirrors 23, 23 which deflect the optical axis 22g of each of the distance measuring devices 22 are mounted on the front end of the measuring head 21. The direction of deflecting, by one of the mirrors 23, of one of the distance measuring devices 22 is arranged to be opposite to the direction of deflecting, by the other of the mirrors 23, of the other of the distance measuring devices 22.

In performing the measurement, the measuring head 21 of the measuring device 22 on each of the right and left sides is moved to the connecting portions B1–B5 on each of the right and left sides of the sub-frame W. The front end of the measuring head 21 on which are mounted the mirrors 23, 23 is inserted into the space between the pair of the plate portions Ba, Ba of each of the connecting portions B1–B5 in such a manner that the optical axis 22g of each of the distance measuring devices 22, which is refracted by each of the mirrors 23, look toward the normal (i.e., right-angle) direction of each of the plate portions Ba.

Figure 8A:
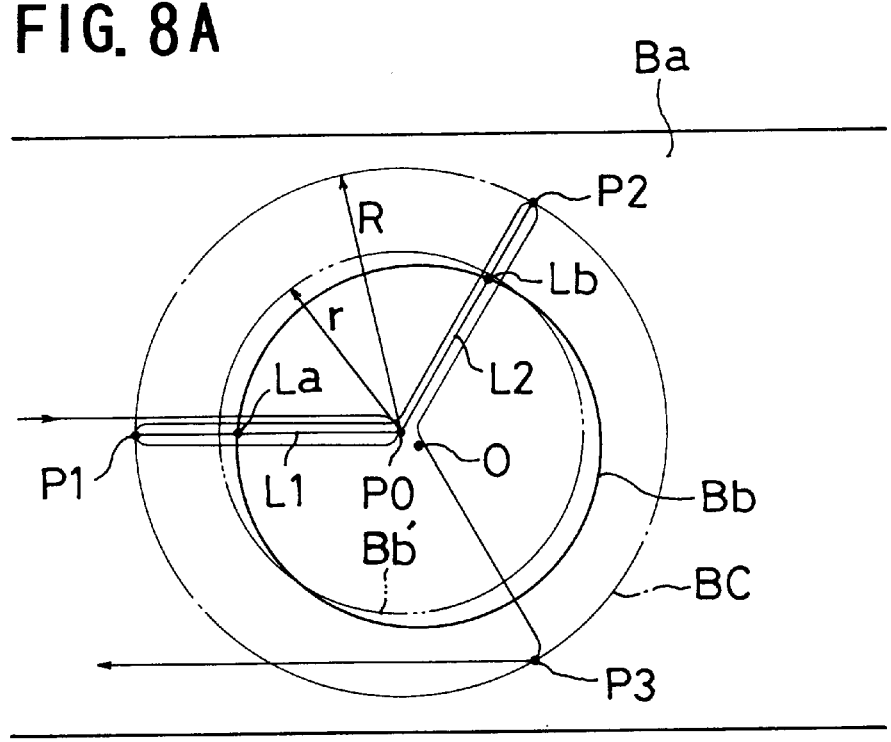
FIG. 8A is a diagram showing the setting of scanning lines and the moving path of the measuring head and FIG. 8B is a diagram showing two circles which pass through first and second hole edge points.

Then, the measuring head 21 is moved by the robot 20 such that the irradiation point of the laser beam to be irradiated from each of the distance measuring devices 22 to each of the plate portions Ba through each of the mirrors 23 moves along each of scanning lines L1, L2 which are set, as shown in FIG. 8A, so as to cross the hole edge of the hole Bb.

The measuring head 21 is moved by a composite motion of a plurality of axes of the robot 20 according to teaching data which are stored in a robot controller 2b. At the time of teaching, by using a master workpiece, setting is made of a position of origin, positions of scanning reference points, and a position of measurement termination point of the measuring head 21 at each of the connecting portions B1–B5. These positional data are stored in the robot controller 2b as the teaching data. The position of origin is set to a position in which the point of irradiation coincides with the center of the hole of each of the connecting portions of the master workpiece, i.e., the center P0 of the hole Bb' positioned in the normal (or ordinary) position. Positions in which the point of irradiation coincides respectively with a first point P1 and a second point P2 on a reference circle BC are set as first and second scanning reference points. This reference circle BC is coaxial with the hole Bb' and has a radius R which is slightly larger (e.g., by 2 mm) than a value which is obtained by adding an amount of estimated maximum deviation (e.g., 3 mm) of the center of the hole Bb to the radius r (e.g., 7 mm) of the hole Bb'. A position in which the point of irradiation coincides with a third point P3 on the reference circle BC is set as the measurement terminal position. Then, by linearly moving the measuring head 21 from each of the scanning reference points toward the position of origin, the point of irradiation is moved along each of first and second scanning lines L1, L2 which connect each of the first and second points P2, P2 to the center P0 of the reference circle BC. The locus of movement of the measuring head 21 corresponding to each of the scanning lines L1, L2 is defined by an equation of a line connecting each of the scanning reference points to the position of origin in a planar coordinate system which is normal to the optical axis 22g. By this equation of the line, the coordinates in the planar coordinate system of each of the points on the scanning lines L1, L2 can be obtained.

In measuring the position of the hole in each of the connecting portions B1–B5, the measuring head 21 is first moved to the position of the first scanning reference point via the position of origin, whereby the point of irradiation is made to coincide with the first point P1 on the reference circle BC. The distance to the plate portion Ba is measured by the distance measuring device 22, and the measured data are transmitted to the computer 2a. Then, the measuring head 21 is linearly moved from the position of the first scanning reference point to the position of origin so that the point of irradiation is moved from the first point P1 along the first scanning line L1. At this time, the distance measured by the distance measuring device 22 rapidly increases, as shown in FIG. 9A, to the measuring (or measurable) limit when the point of irradiation has entered the hole Bb. The position of the measuring head 21 at the point of time of rapid increase in the measured distance is now detected from the positional data in the robot controller 2b. The coordinates, in the planar coordinate system, of that first hole edge point La of the hole Bb which crosses the first scanning line L1 are obtained. The change in the measured distance at the hole edge is so rapid that the coordinates of the hole edge point can be accurately measured without being affected by noises, or the like.

Here, if the speed of moving the measuring head 21 is increased, the resolution in positional detection of the point of change in the detected distance lowers. As a solution, the speed of moving the measuring head 21 is kept relatively low (e.g., about 15 mm/sec.) until the measured distance rapidly increases at the first hole edge portion La so that the position of the hole edge point La can be detected at a high resolution. The distance of low speed movement between the first point P1 and the hole edge point La increases when the position of center of the hole Bb deviates in the direction opposite to (or away from) the first point P1 relative to the center P0 of the reference circle BC. This distance, however, falls at most within about two times the estimated maximum amount of deviation. Therefore, the detection of the hole edge point La does not take much time.

Once the hole edge point La has been detected, the measuring head 21 is moved at a relatively high speed (e.g., 100 mm/sec.) from the position of detecting the hole edge point La to the position of the second scanning reference point via the position of origin so that the point of irradiation is made to coincide with the second point P2 on the reference circle BC. The distance to the plate portion Ba is measured by the distance measuring device, and the measured data are transmitted to the computer 2a. Then, the measuring head 21 is linearly moved from the second scanning reference point toward the position of origin. The point of irradiation is thus moved from the second point P2 along the second scanning line L2. In this case, too, once the point of irradiation has entered the hole Bb, the measured distance by the measuring head 22 rapidly increases to the measuring limit. The position of the measuring head 21 at this point of rapid increase is then detected by the positional data from the robot controller 2b. The coordinates, in the planar coordinate system, of that second hole edge point Lb of the hole Bb which crosses the second scanning line L2 are obtained. Like at the time of scanning along the first scanning line L1, until the measured distance rapidly increases at the second hole edge point Lb, the measuring head 21 is moved at a relatively low speed so that the position of the hole edge point Lb can be detected at a high resolution.

Once the hole edge point Lb has been detected, the measuring head 21 is moved at a relatively high speed from the detected position of the hole edge point Lb to the position of measuring terminal point via the position of origin. The point of irradiation is thus made to coincide with the third point P3 on the reference circle BC. The distance to the plate portion Ba is measured by the distance measuring device 22, and the measured data are transmitted to the computer 2a. Thereafter, the measuring head 21 is moved from the position of measuring terminal point to the connecting portion to be measured next.

Figure 8B:
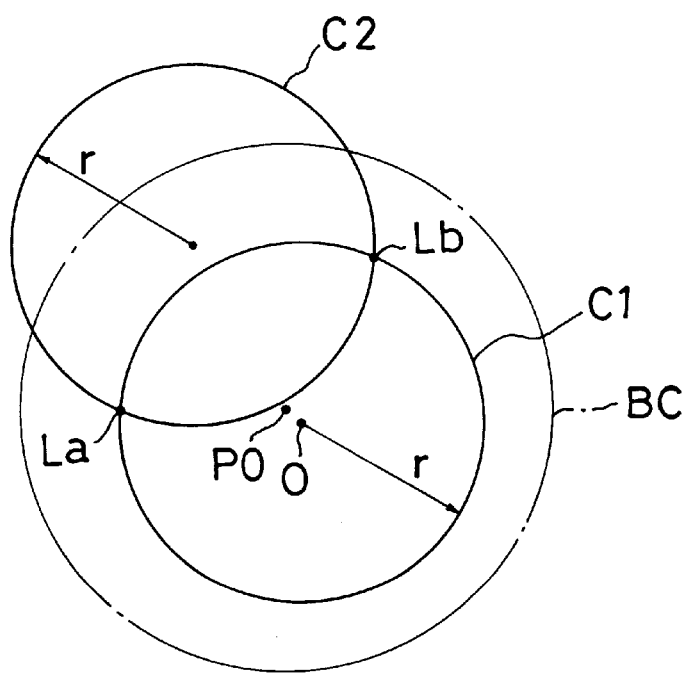

The computer 2a is arranged to make the following computations. Namely, based on the measured results of the first and second scanning reference points and the measuring terminal position, there is computed that equation of surface, in the spatial coordinate system, which represents the surface in which the hole Bb is formed. Then, based on the coordinates of the first and second hole edges La, Lb, there are computed equations, as shown in FIG. 8B, of those two circles C1, C2 on the surface of hole formation which pass through the hole edge points La, Lb and which are equal in radius to the radius r of the hole Bb. The coordinates of the center of the circle, between these two circles C1, C2, which is closer to the center P0 of the reference circle BC (circle C1 in the figure), are made to be the coordinates of the center O of the hole Bb.

In measuring the hole Bb of the plate portion Ba in which the nut Bc has been welded, the measured distance increases, as shown in FIG. 9B, by the amount equivalent to the thickness of the plate portion Ba when the point of irradiation has moved to the point at which the plate surface of the plate portion Ba has transferred to that end surface of the nut Bc which faces the hole Bb. When the point of irradiation has entered the inner diameter of the nut Bc, the measured distance rapidly increases to the measuring (or measurable) limit. The position of crossing between each of the scanning lines L1, L2 and the inner diameter circle of the nut Bc is measured as the position of each of the hole edge points La, Lb. The coordinates of the center of the inner diameter of the nut Bc are obtained as the coordinates of the center of the hole Bb.

Figure 10A:
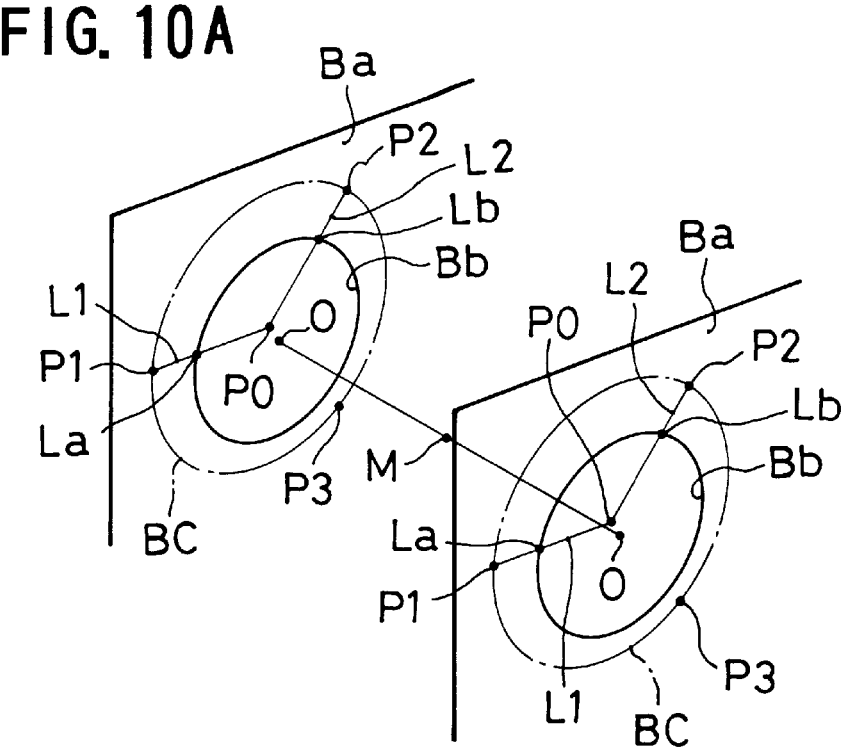
FIG. 10A is a diagram showing the way of obtaining the position at a connecting portion which is an object to be measured.
Figure 10B:
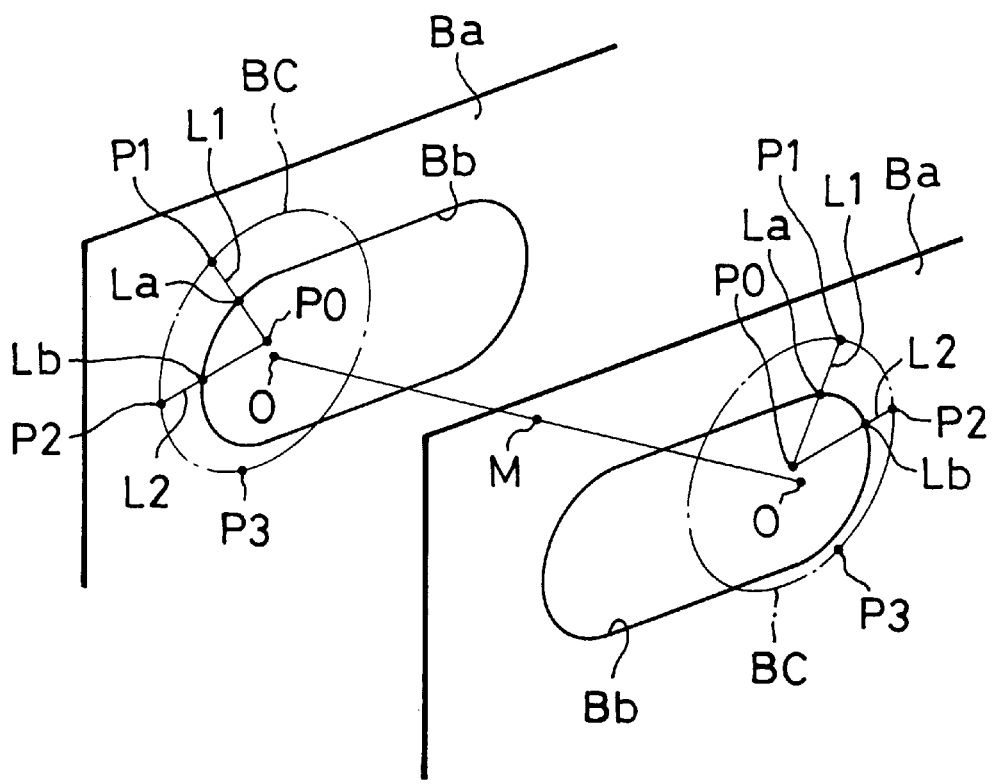
FIG. 10B is a diagram showing the way of obtaining the position at a connecting portion which is provided with a slot.

Then, as shown in FIG. 10A, there is obtained the coordinates of an intermediate point M in a line which connects the center O of the hole Bb in one Ba of the plate portions and the center O of the hole Bb in the other Ba of the plate portions. The deviation of the connecting portion off (or out of) the reference point is measured by making this intermediate point M as a point which represents the position of the connecting portion.

In that connecting portion B3 for the control link S3 in which the hole Bb is formed into an oblong shape, the following procedures are made. Namely, as shown in FIG. 10B, a total of three, i.e., first through third points P1, P2, P3 are set on a semicircle of the reference circle BC which is positioned in a semicircular portion in one longitudinal side, of the hole Bb formed in one Ba of the plate portions and on a semicircle of the reference circle BC which is positioned in a semicircular portion, in the other longitudinal side, of the hole Bb formed in the other Ba of the plate portions. Based on the distance measurement at these three points and the coordinates of the hole edge points La, Lb which cross each of the scanning lines L1, L2 connecting each of the first and second points P1, P2 and the center P0 of the reference circle BC, the coordinates of the center O of each of the semicircles are computed. The intermediate point M of the line to connect the centers O, O of both the semicircles is defined as the point which represents the position of the connecting portion B3, and its coordinates are obtained.

Once the positions of the connecting portions B1–B5 of the right and left sides of the sub-frame W are obtained as explained hereinabove, a discrimination is made as to whether the relative positional accuracies of the connecting portion B1–B5 fall within a tolerance or not. The sub-frame W whose positional accuracy does not fall within the tolerance is recovered as unacceptable. Only those sub-frames W whose accuracies fall within the tolerance are transported to the next step. If the positions of the holes are largely deviated, the coordinates of the hole Bb can sometimes no longer be measured because any one of the three points P1, P2, P3 on the reference circle BC falls inside the hole Bb. In such a case, a display is made to that effect and the sub-frame W is recovered.

In measuring the hole position, the following may also be considered. Namely, the first hole edge point La and the second hole edge point Lb are detected. Then, the measuring head 21 is linearly moved from each of these hole edge points La, Lb to the position of the second scanning reference point or to the position of the measuring terminal point to thereby shorten the measuring time. However, in this procedure, as a result of the displacement of each of the hole edge points La, Lb due to the positional deviation of the hole, the moving path of the measuring head 21 to the position of the second scanning reference point or to the position of the measuring terminal point may vary. As a result, the mode of composite motion of the plurality of axes of the robot 20 at the time of movement of the measuring head 21 may fluctuate from workpiece to workpiece. Here, the actual position of the measuring head 21 is likely to deviate from the position to be recognized by the robot controller 2a due to the effect of the backlash, or the like, in the driving system of each of the axes in the robot 20. When the mode of composite motion of the plurality of axes varies, the degree of effect by the backlash of each of the axes of the driving system on the deviation of the measuring head 21 varies. As a result, the amount of positional deviation of the measuring head 21 changes.

On the other hand, according to the present embodiment, the measuring head 21 is moved from the detecting position of the first hole edge point La or the detecting position of the second hole edge point Lb to the position of the second scanning reference point or to the position of the measuring terminal point, respectively, via the position of origin. Therefore, the path of movement of the measuring head 21 becomes constant irrespective of the position of each of the hole edge points La, Lb. In this manner, the fluctuation of the mode of composition of the plurality of axes of the robot 20 at the time of movement can be prevented. Therefore, even if the measuring head 21 deviates in position due to the backlash, or the like, in the driving system of each of the axes of the robot 20, or even if the point of irradiation deviates from the second point P2 or the third point P3, or even if the actual locus of movement of the point of irradiation deviates from the second scanning line L2, the amount of these deviations will not vary from workpiece to workpiece, but becomes constant. Therefore, the measurement of each of the workpieces can be made on the same conditions as at the time of measuring the master workpiece, with the result that the deviation from the reference position that was obtained in the measurement of the master workpiece can be accurately measured.

In the present embodiment, the measuring head 21 is moved also to the position of the first scanning reference point through the position of origin. However, as long as the moving path to the position of the first scanning reference point is made constant, the amount of deviation of the irradiation point from the first point P1 does not vary from workpiece to workpiece, but becomes constant. Therefore, the measuring head may also be moved to the position of the first scanning reference point without passing through the position of origin.

Further, in the present embodiment, a pair of right and left calibration blocks 15, 15, each of which is made up of a U-shaped frame body, are provided in the jig 1. Before measuring the positions of the connecting portions B1–B5 by the measuring device 2, the front end portion of the measuring head 21 is inserted into the space between the side plates 15a, 15a, which face (or lie opposite to) each other of the calibration blocks 15, 15. The coordinates of the center of the hole 15b formed in each of the side plates 15a are measured. The deviation, off the reference position, of the intermediate point on a line which connects the centers of both holes 15b, 15b is thus measured. This deviation is due to an error in alignment of the measuring head 21 by the robot 20. The first and second positions of the scanning reference points at each of the connecting portions B1–B5 and the position of origin are corrected depending on this deviation. The measuring head 21 is thus correctly positioned relative to each of the connecting portions B1–B5.

The sub-frame W is mounted on the vehicle frame such that the positional deviation of the mounting holes A1–A4 can be allowed as explained hereinabove. Therefore, even if the widthwise dimensions in the right and left direction of the sub-frame W fluctuate within the range of tolerance, there is no problem. However, when the positions on the right and left sides of the sub-frame W are measured by the measuring devices 2 on the right and left sides as explained hereinabove, if there is an error in dimensions, there is the following problem. Namely, when the measuring head 21 is moved to the measuring positions relative to the connecting portions B1, B5 for the trailing link S1 or the leading link S5, which are inclined in the forward and backward direction, the measuring head 21 interferes with the connecting portions B1, B5. As a result, the front end position thereof cannot be inserted into the space between the plate portions Ba, Ba. Or else, even if the front end portion can be inserted thereinto, the front end portion may come into abutment with the plate portion during the scanning, with the result that a measuring error may occur.

Here, the error in the widthwise dimension of the subframe W is detected by the detecting means 114 as an amount of displacement, off the reference position, of one of the right and left workpiece receiving members 11 which are movable in the right and left direction. Therefore, if the measuring reference position of one of the right and left measuring devices 2 is corrected to the right or left direction by an amount of displacement, off each of the connecting portions B1–B5, as detected by the detecting means 114, the front end of the measuring head 21 can be surely inserted into the space between the plate portions Ba, Ba of each of the connecting portions B1–B5, and there will be no measuring error.

As explained hereinabove, according to the present invention, by using a distance measuring device, the position of a hole can be measured at a high accuracy without being influenced by noises, or the like. Further, by using mirrors, the measurement of a hole which is formed in a complicated place of a workpiece can also be performed. Still furthermore, by providing the distance measuring device and the mirrors in a pair, the position of a hole formed in a pair of plate portions which face each other can also be efficiently measured.

It is readily apparent that the above-described method of, and apparatus for, measuring a position of a hole meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of measuring a position of a hole which is formed in a workpiece, said method comprising:
   providing a distance measuring device which measures a distance to an object to be measured by irradiating and receiving a beam of light to and from the object;
   moving the distance measuring device relative to the workpiece such that a point of irradiation of the light beam onto the workpiece moves along a scanning line which is set so as to cross an edge of said hole; and
   obtaining coordinates of a point on said hole edge based on a change in that distance to the workpiece which is measured by the distance measuring device while moving the measuring device.

2. A method of measuring a position of a hole which is formed in a workpiece, said method comprising:
   moving a distance measuring device which measures a distance to an object to be measured by irradiating and receiving light to and from the object, said moving being made relative to the workpiece such that a point of irradiation of the light beam onto the workpiece moves along a scanning line which is set so as to cross a hole edge;
   obtaining coordinates of a hole edge point based on a change in that distance to the workpiece which is measured by the distance measuring device while moving the measuring device;
   setting a position of origin in which the point of irradiation coincides with a center of the hole in a normal position, and a plurality of positions of scanning reference points in which the point of irradiation coincides with a plurality of points on a reference circle which is coaxial with the hole in the normal position and whose radius is slightly larger than a value to be obtained by adding to the radius of the hole an estimated maximum deviation of the center of the hole;
   moving the distance measuring device in sequence to each of the scanning reference points to linearly move the distance measuring device from each of the scanning reference points to the position of origin such that the point of irradiation moves along each of the scanning lines which connects each point on the reference circle to a center of the reference circle;
   wherein a speed of moving the distance measuring device is kept relatively low until the distance to the workpiece to be measured by the distance measuring device changes at the hole edge point which crosses the scanning line, and thereafter the distance measuring device is moved to the next position of scanning reference point via the position of origin at a relatively high speed.

3. A method according to claim 2, further comprising:
   setting a first scanning reference point at which the point of irradiation coincides with a first point on the reference circle, a second scanning reference point at which the point of irradiation coincides with a second point on the reference circle, and a measuring terminal point at which the point of irradiation coincides with a third point on the reference circle;
   after measuring the distance to the workpiece at the first scanning reference point, linearly moving the distance measuring device from the first scanning reference point toward the position of origin to obtain coordinates of the first hole edge point which crosses the first scanning line connecting the first point and the center of the reference circle;
   after measuring the distance to the workpiece at the second scanning reference point, linearly moving the distance measuring device from the second scanning reference point toward the position of origin to obtain coordinates of the second hole edge point which crosses the second scanning line connecting the second point and the center of the reference circle;
   thereafter moving the distance measuring device to the position of the measuring terminal point via the position of origin to measure the distance to the workpiece;
   obtaining an equation which represents a plane of forming the hole of the workpiece based on the distance to the workpiece at the positions of the first and second scanning reference points and the position of the measuring terminal point;
   obtaining equations of two circles on the plane of forming the hole, the two circles being equal in diameter to the hole and passing through both the hole edge points, the equations being obtained based on the coordinates of the first and second hole edge points; and
   determining the coordinates of the center of the circle whose center is closer to the center of the reference circle as the coordinates of the center of the hole.

4. An apparatus for measuring a position of a hole formed in a workpiece, comprising:
   a robot having a working end which is movable toward and away from said workpiece,
   a measuring head on the working end of said robot and having a distance measuring device mounted thereon, means on said distance measuring device for irradiating and receiving light to and from said workpiece containing said hole, and means for moving the distance measuring device in a direction such that a point of the light irradiated onto the workpiece moves along a scanning line which is set so as to cross an edge of the hole in the workpiece.

5. An apparatus according to claim 4, wherein the measuring head is provided, at a front end of the distance measuring device, with a mirror which deflects an optical axis of a light beam of the distance measuring device onto said workpiece.

6. An apparatus according to claim 5, wherein the measuring head is provided with a pair of sets of a distance measuring device and a mirror arranged such that the direction of deflection, by one of the mirrors, of an optical axis of the light beam of one of the measuring devices and the direction of deflection, by the other of the mirrors, of an optical axis of the light beam of the other of the distance measuring devices are opposite to each other.

* * * * *